(12) United States Patent
Ouyang (10) Patent No.: US 10,874,257 B2
(45) Date of Patent: Dec. 29, 2020

(54) BLENDER

(71) Applicants: Sinsion Technology Industrial Co., Ltd., Jiangmen (CN); Shenzhen YouYou Electric Appliance Co., Ltd., Shenzhen (CN)

(72) Inventor: Honglong Ouyang, Shenzhen (CN)

(73) Assignees: SINSION TECHNOLOGY INDUSTRIAL CO., LTD., Jiangmen (CN); SHENZHEN YOUYOU ELECTRIC APPLIANCE CO., LTD, Shenzhen (CN)

( * ) Notice: Subject to any disclaimer, the term of this patent is extended or adjusted under 35 U.S.C. 154(b) by 267 days.

(21) Appl. No.: 16/057,495

(22) Filed: Aug. 7, 2018

(65) Prior Publication Data

US 2019/0045976 A1    Feb. 14, 2019

(30) Foreign Application Priority Data

Aug. 11, 2017  (CN) .......................... 2017 1 0686858
Aug. 20, 2017  (CN) ..................... 2017 2 1041502 U
Aug. 20, 2017  (CN) ..................... 2017 2 1041873 U (51) Int. Cl.
*A47J 43/08*    (2006.01)
*A47J 43/046*   (2006.01)
(Continued)

(52) U.S. Cl.
CPC .............. *A47J 43/085* (2013.01); *A23N 1/02* (2013.01); *A47J 43/046* (2013.01); *B01F 7/166* (2013.01);
(Continued)

(58) Field of Classification Search
CPC . A23N 1/02; A47J 43/046; A47J 43/06; A47J 43/0716; A47J 43/085; A47J 43/08;
(Continued)

(56) References Cited

U.S. PATENT DOCUMENTS 2,807,447 A  *  9/1957  Vaughan ............... A47J 43/046
                                                     366/296
3,176,968 A  *  4/1965  Appleton .............. A47J 43/046
                                                     366/146

(Continued)

*Primary Examiner* — Reginald Alexander
(74) *Attorney, Agent, or Firm* — D'Ambrosio & Menon, PLLC; Usha Menon (57) ABSTRACT

A blender including: a transmission base including a motor support, a motor shaft, a forward driver connected at a top of the motor shaft and a reverse driver rotating in opposite direction to the forward driver; a drive gear coaxially connected at a middle of the motor shaft; a reverse drive gear connected with the reverse driver; a reverse gear set for connecting the drive gear to the reverse drive gear arranged on the base; a blade device including a forward connector connected to the forward driver, a reverse connector connected to the reverse driver, a reverse blade shaft above the reverse connector, a forward blade shaft above the forward connector, the reverse blade shaft being provided with a central hole and connected with a reverse blade, the forward blade shaft being configured for passing through the central hole of the reverse blade shaft and connection with a forward blade.

9 Claims, 5 Drawing Sheets (51) Int. Cl.
  *B01F 7/16*   (2006.01)
  *A23N 1/02*   (2006.01)
  *B01F 15/00*  (2006.01)

(52) U.S. Cl.
  CPC ..... *B01F 7/162* (2013.01); *B01F 2015/00636* (2013.01)

(58) Field of Classification Search
  CPC .......... B01F 7/043; B01F 7/166; B01F 7/162; B01F 2015/00636
  USPC .................................. 99/510, 513; 366/296
  See application file for complete search history.

(56) References Cited

U.S. PATENT DOCUMENTS

| | | | | |
|---|---|---|---|---|
| 4,195,754 A | * | 4/1980 | Heier ..................... | A23G 9/045 222/146.6 |
| 9,149,156 B2 | * | 10/2015 | Rosenzweig ....... | A47J 43/0722 |
| 2018/0056254 A1 | * | 3/2018 | Liu ................... | B01F 15/00538 |

* cited by examiner

BLENDER

CROSS-REFERENCE TO RELATED APPLICATION(S)

This application claims priority from and the benefit of Chinese Patent Application No. 201710686858.1, filed on Aug. 11, 2017, Chinese Patent Application No. 201721041502.4 filed on Aug. 20, 2017, and Chinese Patent Application No. 201721041873.2, also filed on Aug. 20, 2017, all of which are hereby incorporated by reference for all purposes as if fully set forth herein.

FIELD OF INVENTION

The present disclosure relates to the technical field of kitchen accessories, and particularly to a blender.

BACKGROUND

A blender is a commonly-used household appliance in people's daily life. In the prior art, when the blender is used to make juice or crush food, a stirring blade can rotate at a high speed only in one direction to crush all kinds of foods, so as to obtain the juice or crushed pieces required. However, it is not easy for the food to be crushed to a desired degree due to the stirring knife only rotating in one direction, that is, the food processing result is not satisfactory.

SUMMARY

The present disclosure aims at solving at least one of the technical problems above in the related art to some extent. To this end, the present disclosure provides a blender aiming at solving the problem that the food is not easily crushed in the blender.

In order to achieve the object above, the present disclosure adopts the following technical solutions.

A blender, comprising:
a transmission base, comprising:
  a motor support,
  a motor shaft,
  a forward driver directly connected at a top of the motor shaft, and
  a reverse driver rotating in an opposite direction to the forward driver,
a drive gear coaxially connected at a middle of the motor shaft,
a reverse drive gear connected with the reverse driver,
a reverse gear set for connecting the drive gear to the reverse drive gear arranged on the transmission base, and
a blade device, comprising:
  a forward connector correspondingly connected to the forward driver,
  a reverse connector connected to the reverse driver,
  a reverse blade shaft mounted above the reverse connector, the reverse blade shaft being provided with a central hole and connected with a reverse blade, and
  a forward blade shaft mounted above the forward connector, the forward blade shaft being configured for passing through the central hole of the reverse blade shaft and for connection with a forward blade.

As a further improvement of the technical solution above, the reverse gear set comprises a short transmission gear engaged with the drive gear and a long transmission gear engaged with both the short transmission gear and the reverse drive gear.

As a further improvement of the technical solution above, the short transmission gear is provided with a short transmission gear center hole through which a short transmission gear shaft is fixed to the motor support.

As a further improvement of the technical solution above, the long transmission gear is provided with a long transmission gear center hole through which a long transmission gear shaft is fixed to the motor support.

As a further improvement of the technical solution above, the motor shaft is configured for passing through a center of the reverse drive gear.

As a further improvement of the technical solution above, the reverse gear set comprises at least one planetary gear engaged with the drive gear, and the reverse drive gear is provided as an inner gear ring engaged with the planetary gear by an inner wall of the inner gear ring.

As a further improvement of the technical solution above, the transmission base further comprises a planetary gear support and a planetary gear fixed shaft, and the driven gear is fixedly mounted between the motor support and the planetary gear support by the planetary gear fixed shaft.

As a further improvement of the technical solution above, the forward connector and the forward driver are both provided with forward gear teeth by which the forward connector and the forward driver are engaged with each other, and the reverse driver and the reverse connector are both provided with reverse gear teeth by which the reverse driver and the reverse connector are engaged with each other.

As a further improvement of the technical solution above, the blender further comprises a housing including an upper housing for containing the blade device and a lower housing for containing the transmission base.

As a further improvement of the technical solution above, the transmission base is further arranged with a motor for supplying power to the motor shaft, and the motor is connected to a bottom of the motor shaft.

The present disclosure has the beneficial effects that:

There is provided a blender which comprises a transmission base including a motor support, a motor shaft, a forward driver connected at a top of the support and a reverse driver rotating in opposite direction to the forward driver; a drive gear coaxially connected at a middle of the motor shaft; a reverse drive gear connected with the reverse driver; a reverse gear set for connecting the drive gear to the reverse drive gear arranged on the base; a blade device including a forward connector connected to the forward driver, a reverse connector connected to the reverse driver, a reverse blade shaft above the reverse connector, a forward blade shaft above the forward connector, the reverse blade shaft being provided with a central hole and connected with a reverse blade, the forward blade shaft being configured for passing through the central hole of the reverse blade shaft and connection with a forward blade. Through the high-speed rotations of the forward and reverse blades in different directions, the present disclosure can better crush all kinds of ingredients and can be used in a blender and a food processor.

BRIEF DESCRIPTION OF THE DRAWINGS

Further description is made with reference to the drawings and the examples.

NUMERAL REFERENCES OF MAIN ELEMENTS

1—transmission base; 10—forward driver; 11—reverse driver; 12—motor shaft; 13—drive gear; 14—short transmission gear; 15—short transmission gear shaft; 16—long transmission gear; 17—long transmission gear shaft; 18—reverse drive gear; 19—motor support; 20—motor; 14-1—planetary gear; 15-1—planetary gear support; 16-1—planetary gear fixed shaft;

2—blade device; 21—forward connector; 22—reverse connector; 23—forward blade shaft; 24—forward blade; 25—reverse blade shaft; 26—reverse blade; and

3—housing; 31—upper housing; and 32—lower housing.

DETAILED DESCRIPTION OF THE EMBODIMENTS

The embodiments of the present disclosure will be described in detail below, and the examples of the embodiments are shown in the accompanying drawings, wherein the same or similar numerals throughout the drawings denote the same or similar elements or the elements having the same or similar functions. The embodiments described below with reference to the accompanying drawings are exemplary and are intended to explain the present disclosure, but cannot be construed as limiting the present disclosure.

Refer to FIGS. 1 to 6.

Figure 1:
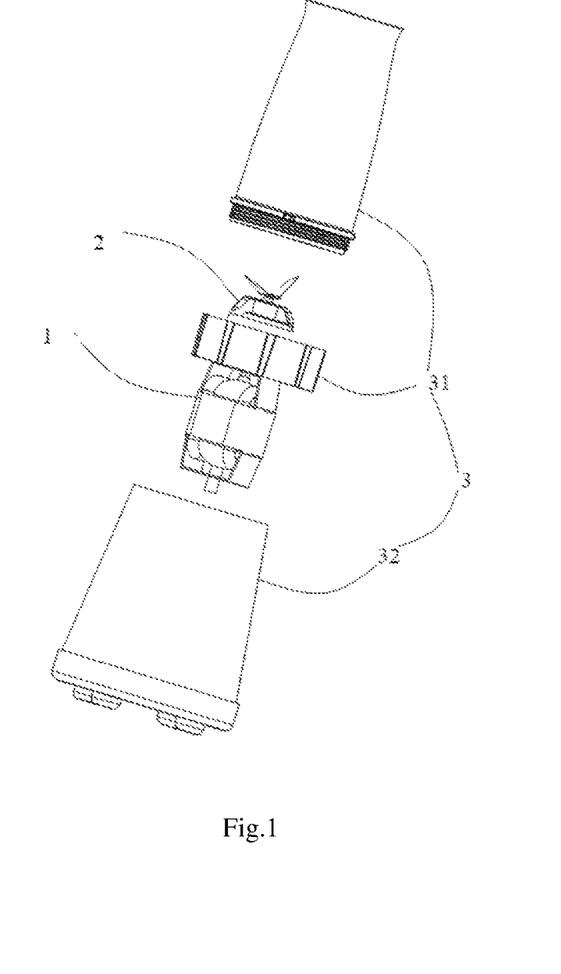
FIG. 1 is a structural schematic diagram of the present disclosure.

A blender is provided comprising a transmission base 1 and a blade device 2.

Figure 4:
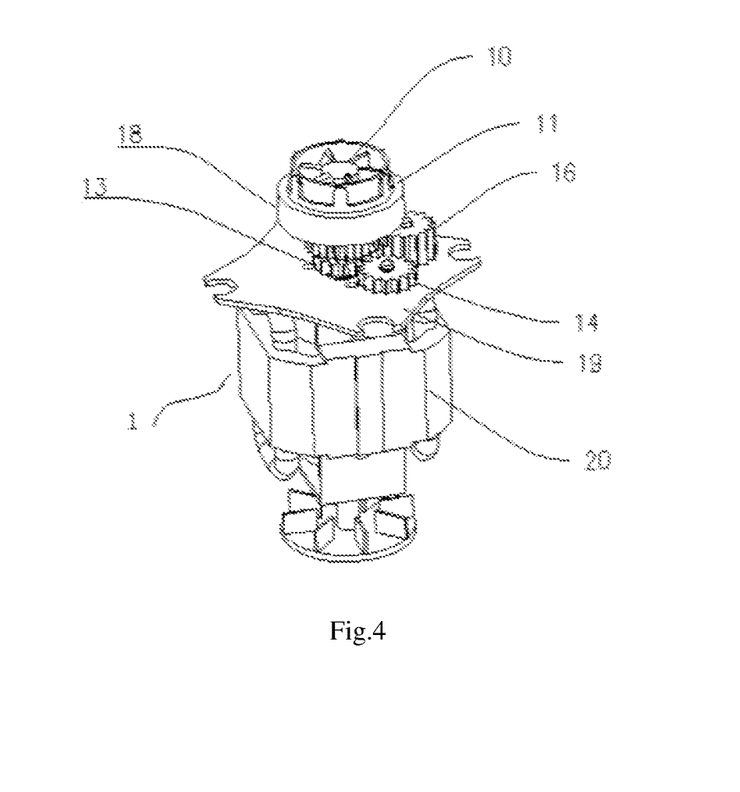
FIG. 4 is a structural schematic diagram of an assembled transmission base of the present disclosure.
Figure 5:
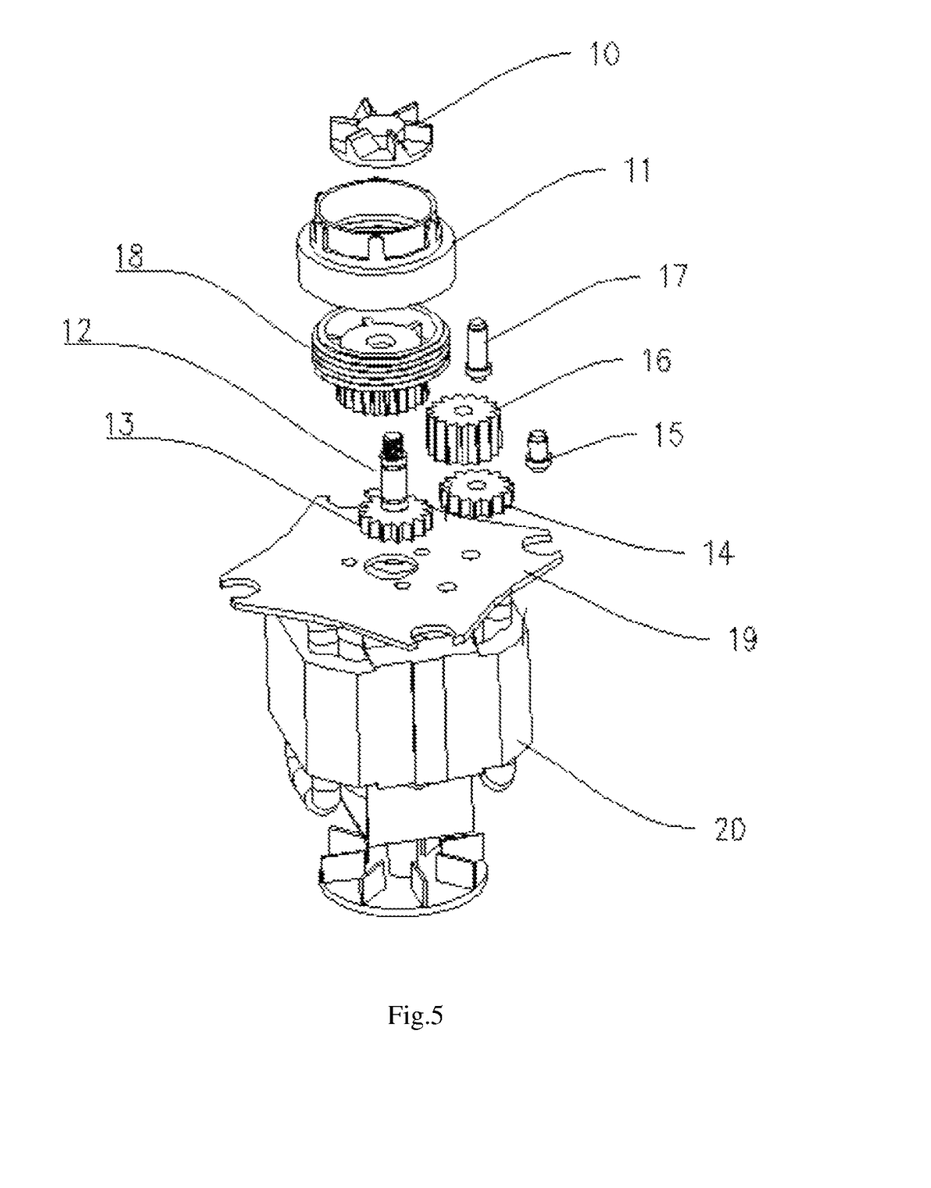
FIG. 5 is an exploded structural schematic diagram of one embodiment of the transmission base of the present disclosure.

The transmission base 1 comprises a motor support 19, a motor shaft 12, a forward driver 10 and a reverse driver 11 which rotate in opposite directions. The forward driver 10 is directly connected to a top of the motor shaft 12, and the motor shaft 12 is coaxially connected with a drive gear 13 at a middle thereof. The reverse driver 11 is connected to a reverse drive gear 18, and the transmission base is provided with a reverse gear set for connecting the drive gear 13 to the reverse drive gear 18. As a first embodiment, a combination form of the reverse gear set is as follows. The drive gear 13 is engaged with a short transmission gear 14 which is engaged with a long transmission gear 16 at a bottom of the long transmission gear 16, and the long transmission gear 16 is engaged at a top of the long transmission gear 16 with the reverse drive gear 18 which is connected to the reverse driver 11. The motor shaft 12 passes through a center of the reverse drive gear 18. The short transmission gear 14 is provided with a short transmission gear center hole through which the short transmission gear shaft 15 is fixed to the motor support 19. The long transmission gear 16 is provided with a long transmission gear center hole through which the long transmission gear shaft 17 is fixed to the motor support 19.

Figure 6:
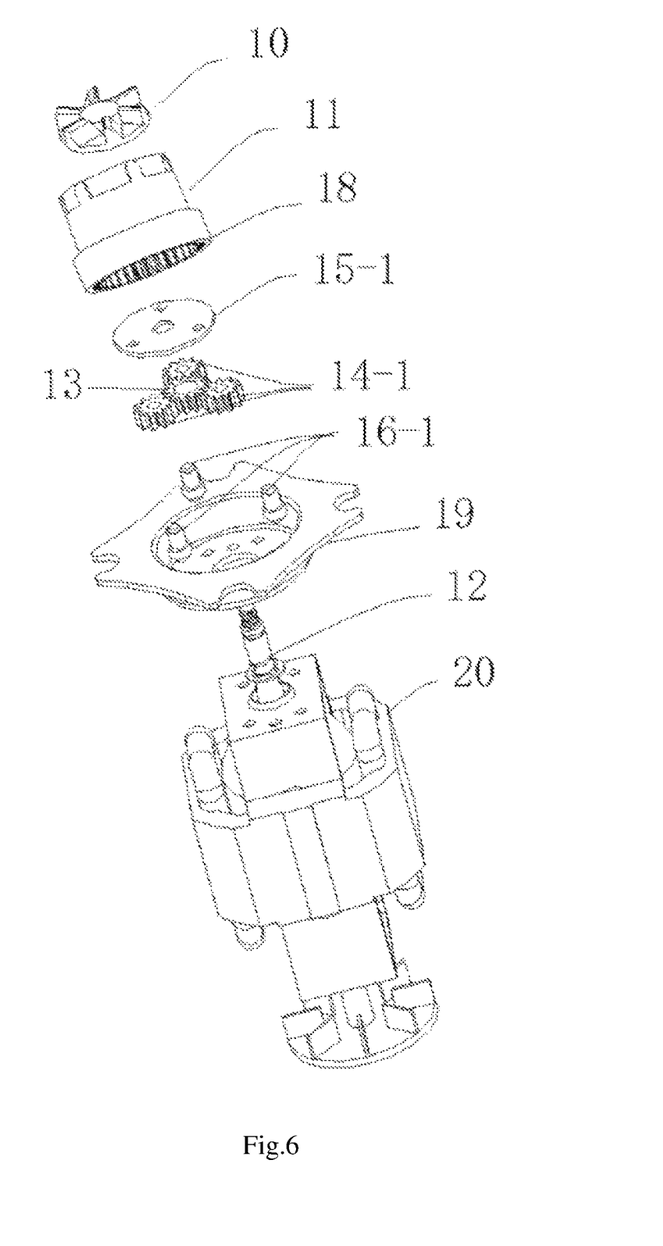
FIG. 6 is an exploded structural schematic diagram of another embodiment of the transmission base of the present disclosure.

Another embodiment of the present disclosure, in which the reverse gear set above is replaced with a planetary gear 14-1 set, is shown as follows. The reverse gear set in this embodiment comprises at least one planetary gear 14-1 engaged with the drive gear 13. Preferably, there is provided three planetary gears 14-1 which are evenly distributed on an outer side of the drive gear 13 and driven by the drive gear 13 for rotation. In addition, the reverse drive gear 18 is arranged as an inner gear ring which is engaged with the planetary gears 14-1 by an inner wall of the inner gear ring. In short, each of the planetary gears 14-1 is connected to the drive gear 13 and the inner gear ring at both sides of the planetary gear respectively, and the inner gear ring may be driven by the planetary gear 14-1 for rotation. Further, the inner gear ring refers to that the inner wall thereof is provided with gear teeth, and in this embodiment, the gear teeth of the inner gear ring are engaged with the gear teeth of the planetary gears 14-1, that is, the planetary gears 14-1 are arranged with an cavity of the inner ring gear, so that the inner ring gear is rotatable under the driving of the planetary gears 14-1, and the inner ring gear rotates in opposite direction to the motor shaft 12.

In this embodiment, the transmission base 1 further comprises a planetary gear support 15-1 and a planetary gear fixed shaft 16-1 through which the driven gear is fixedly mounted between the motor support 19 and the planetary gear support 15-1.

As described above, it can be understood that the motor support 19 and the planetary gear support 15-1 are both provided with a central hole, a top portion of the motor shaft 12 firstly passes through the central hole of the motor support 19 and then passes through the central hole of the planetary gear support 15-1, and the motor support 19 and the planetary gear support 15-1 are arranged between the motor and the inner gear ring. Further, the drive gear 13 and the planetary gears 14-1 are mounted between the motor support 19 and the planetary gear support 15-1, and the center hole of the drive gear 13 is aligned with the center hole of the motor support 19. In addition, there are further provided planetary gear fixed shafts 16-1 which are fixedly mounted between the motor support 19 and the planetary gear support 15-1 and pass through the central hole of the planetary gears 14-1 so that the planetary gears 14-1 can be rotatably mounted thereto and can be rotated under the driving of the drive gear 13 engaged therewith.

Figure 2:
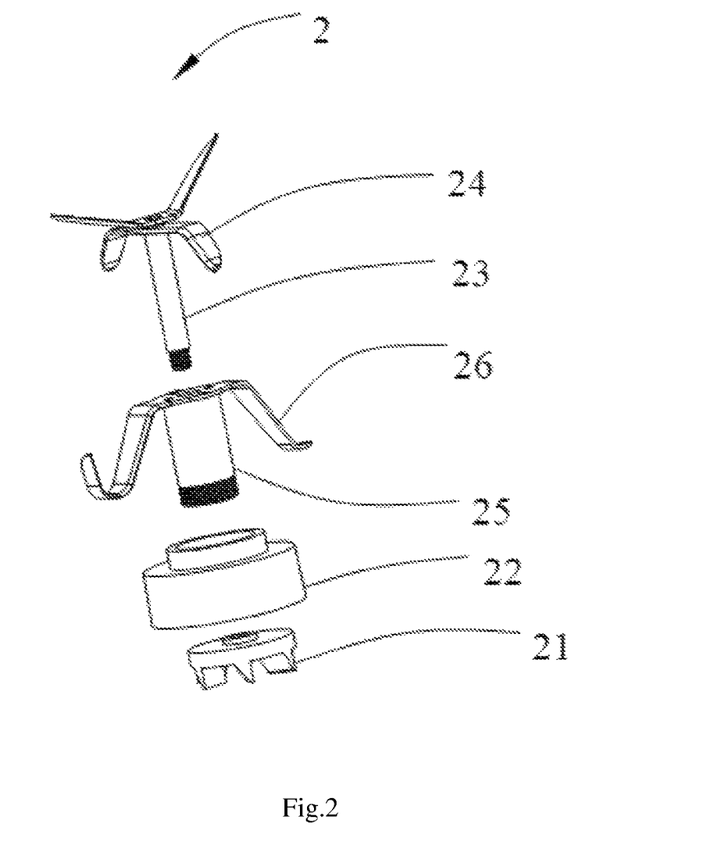
FIG. 2 is an exploded structural schematic diagram of a blade device of the present disclosure.
Figure 3:
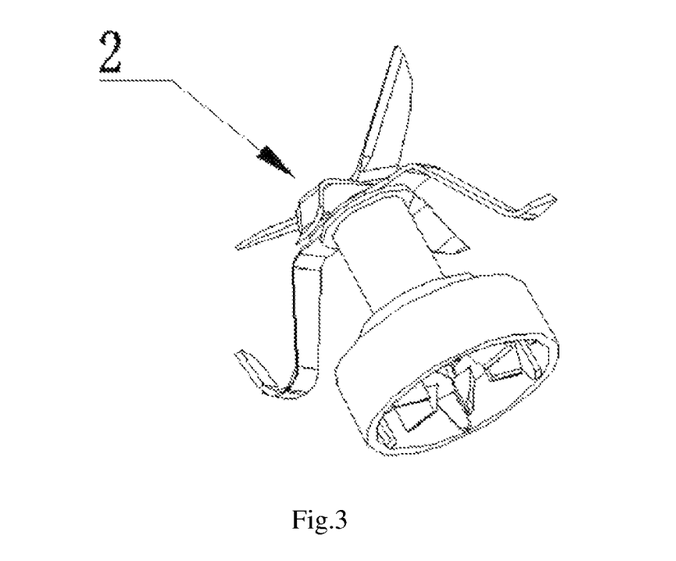
FIG. 3 is a structural schematic diagram of the assembled blade device of the present disclosure.

The blade device 2 comprises a forward connector 21 correspondingly connected to the forward driver 10, a reverse connector 22 connected to the reverse driver 11, a reverse blade shaft 25 mounted above the reverse connector 22, and a forward blade shaft 23 mounted above the forward connector 21. The reverse blade shaft 25 is provided with a central hole and a reverse blade 26, and the forward blade shaft 23 passes through the central hole of the reverse blade shaft 25 and is connected with a forward blade 24.

The above refers to that the transmission base 1 and the blade device 2 can be separated from each other. Specifically, the transmission base 1 comprises the motor shaft 12 for providing a rotational power, the motor shaft 12 is connected to the forward driver 10 at a top of the motor shaft by for example a threaded connection. For example, the motor shaft 12 is provided with a thread at the top, and the forward driver 10 is provided at a center with a threaded groove corresponding to the thread, so that the motor shaft 12 can be fixedly connected to the forward drive 10.

Moreover, since the motor shaft 12 is rotatable, the forward driver 10 can be rotated under the driving of the motor shaft 12.

Thus, the transmission base 1 of the blender can provide two types of power. One is through the forward driver 10 directly connected to the motor shaft 12, which may be brought into rotation by the motor shaft 12. The other is through the reverse driver 11, wherein the power is transmitted from the drive gear 13 coaxially connected at the middle of the motor shaft 12 to the short transmission gear 14 engaged with the drive gear 13, and then is transmitted to the long transmission gear 16 engaged at the top with the reverse drive gear 18, and finally to the reverse driver 11 engaged with the reverse drive gear 18. The reverse driver 11 rotates in opposite direction to the forward driver 10. Alternatively, the other type of power may be provided by the inner gear ring driven by the planetary gears 14-1. The inner gear ring is provided at the inner wall with gear teeth for engagement with the planetary gears 14-1, and the forward driver 10 rotates in opposite direction to the inner gear ring. In addition, the inner gear ring is connected to the reverse driver 11 at the top thereof, and rotation of the reverse driver 11 is synchronized with that of the inner gear ring.

Further, the blender further comprises a blade device 2. Specifically, the blade device 2 comprises a forward connector 21 that can be connected to the forward driver 10. The blender may further comprise a reverse connector 22 that can be connected to a periphery of the reverse driver 11. The blender may further comprise a forward blade shaft 23 with a forward blade 24 fixedly mounted at the top thereof. The forward blade shaft 23 is connected to the forward connector 21 at the bottom of the shaft 23 by for example a threaded connection. For example, the forward blade shaft 23 is provided at the bottom with a thread, and the forward connector 21 is provided at the center with a threaded groove corresponding to the thread, so that the forward blade shaft 23 can be fixedly connected to the forward connector 21. Preferably, the forward connector 21 and the forward driver 10 are provided with forward gear teeth which can be engaged with each other, and the reverse driver 11 and the reverse connector 22 are provided with reverse gear teeth which can be engaged with each other.

In addition, a reverse blade shaft 25 is arranged above the reverse connector 22, and a reverse blade 26 is arranged at the top portion of the reverse blade shaft 25. In another embodiment, the reverse connector 22 and the reverse blade shaft 25 are further provided with a central hole, and the bottom portion of the forward blade shaft 23 is connected to the forward connector 21 after passing through the central hole of the reverse connector 22.

Therefore, it can be understood that the forward connector 21 is rotatable under the driving of the forward driver 10, and the forward blade shaft 23 is fixedly connected to the forward connector 21, so that the forward blade shaft 23 is rotatable under the driving of the forward connector 21. Due to the rotation of the forward blade shaft 23, the forward blade 24 fixedly mounted at the top of the forward blade shaft 23 is rotatable with the rotation of the forward blade shaft 23, thereby cutting and crushing the food. Moreover, the reverse connector 22 can be fixedly connected to the periphery of the reverse driver 11 through the inner wall thereof, so that the rotation of the reverse driver 11 drives the rotation of the reverse connector 22, and the reverse blade shaft 25 mounted on the top portion of the reverse connector 22 rotates under the driving of the reverse connector 22, thereby cutting and crushing the food. The forward blade 24 rotates in opposite direction to the reverse blade 26.

In this embodiment, the blender further comprises a housing 3, wherein the housing 3 comprises an upper housing 31 for containing the blade device 2 and a lower housing 32 for containing the transmission base 1.

It can be understood that the food can be placed in the cavity of the upper housing 31, and the blade device 2 arranged in the cavity of the upper housing 31 can cut and crush the food. The upper housing 31 is further provided at one end thereof with a through hole corresponding to the reverse connector 22, so that the reverse connector 22 and the forward connector 21 in the cavity thereof can be exposed to outside of the upper housing 31, and are respectively connected to the reverse driver 11 and the forward driver 10 in the cavity of the lower housing 32.

In this embodiment, the transmission base 1 further comprises a motor 20 for supplying power to the motor shaft 12, and the motor 20 is connected at a bottom of the motor shaft 12.

In the description of the present disclosure, it is to be understood that the orientations or location relationships denoted by terms "center", "longitudinal", "horizontal", "length", "width", "thickness", "upper", "lower", "front", "back", "left", "right", "vertical", "horizontal", "top", "bottom", "inner", "outer", "clockwise", "counterclockwise", etc. are the orientations and location relationships based on the drawings, and are merely for the convenience of the description of the disclosure and the simplification of the description, instead of indicating or implying that the referred device or element shall have a specific orientation, or shall be constructed and operated by a specific orientation. Therefore, it cannot be understood as limiting the present disclosure.

In addition, the terms "first" and "second" are used for descriptive purposes only and cannot be construed as indicating or implying a relative importance or implicitly indicating the number of technical features indicated. Thus, the features defined by "first" and "second" may explicitly or impliedly comprise one or more features. In the description of the present disclosure, the meaning of "a plurality of" is at least two, such as two, three, etc., unless otherwise explicitly and specifically defined.

In the present disclosure, unless otherwise explicitly regulated and defined, the terms "mount", "connected", "connect", "fix" and the like shall be understood broadly. For example, it may be fixed connection, detachable connection, or integration; it may be mechanical connection or electric connection; and it may be direct connection or indirect connection through an intermediate medium, or internal communication between two elements or an interaction relationship between two elements. Those of ordinary skills in the art can understand the specific meanings of the above terms in the present disclosure according to specific condition.

In the present disclosure, unless otherwise explicitly regulated and defined, the first feature being "above" or "below" the second feature may means that the first and second features are directly contacted, and may also means that the first and second features are contacted through other features therebetween instead of indirect contact. Moreover, the first feature being "on", "above" and "on top of" the second feature means that the first feature is right above or obliquely above the second feature, or merely indicates that the level height of the first feature is higher than that of the second feature. The first feature being "under", "below" and "at bottom of" the second feature means that the first feature is right below or obliquely below the second feature, or merely indicates that the level height of the first feature is lower than that of the second feature.

In the presentation of the specification, the description with reference to the terms of "an embodiment", "some embodiments", "example", "specific example", or "some examples" and the like indicates that the specific characteristic, structure, material or feature described in the embodiment or the example are included in at least one embodiment or example of the present disclosure. In the specification, the schematic expression of the above terms is not necessarily directed to the same embodiment or example. Furthermore, the specific characteristic, structure, material, or feature described may be combined in a suitable manner in any one or more embodiments or examples. In addition, various embodiments or examples described in the specification can be joined and combined by those skilled in the art.

Although the embodiments of the present disclosure have been shown and described above, it can be understood that the embodiments above are exemplary and cannot be construed as limiting the present disclosure. Changes, modifications, replacements and variations to the embodiments above can be made by those skilled in the art without departing from the scope of the present disclosure.

What is claimed is:

1. A blender, comprising:
    a transmission base, comprising:
        a motor support,
        a motor shaft,
        a forward driver directly connected at a top of the motor shaft, and
        a reverse driver rotating in an opposite direction to the forward driver,
    a drive gear coaxially connected at a middle of the motor shaft,
    a reverse drive gear connected with the reverse driver,
    a reverse gear set for connecting the drive gear to the reverse drive gear arranged on the transmission base, the reverse gear set comprises a short transmission gear engaged with the drive gear and a long transmission gear engaged with both the short transmission gear and the reverse drive gear, and
    a blade device, comprising:
        a forward connector correspondingly connected to the forward driver,
        a reverse connector connected to the reverse driver,
        a reverse blade shaft mounted above the reverse connector, the reverse blade shaft being provided with a central hole and connected with a reverse blade, and
        a forward blade shaft mounted above the forward connector, the forward blade shaft being configured for passing through the central hole of the reverse blade shaft and for connection with a forward blade.

2. The blender according to claim 1, wherein the short transmission gear is provided with a short transmission gear center hole through which a short transmission gear shaft is fixed to the motor support.

3. The blender according to claim 1, wherein the long transmission gear is provided with a long transmission gear center hole through which a long transmission gear shaft is fixed to the motor support.

4. The blender according to claim 1, wherein the motor shaft is configured for passing through a center of the reverse drive gear.

5. The blender according to claim 1, wherein the reverse gear set comprises at least one planetary gear engaged with the drive gear, and the reverse drive gear is provided as an inner gear ring engaged with the planetary gear by an inner wall of the inner gear ring.

6. The blender according to claim 5, wherein the transmission base further comprises a planetary gear support and a planetary gear fixed shaft, and the driven gear is fixedly mounted between the motor support and the planetary gear support by the planetary gear fixed shaft.

7. The blender according to claim 1, wherein the forward connector and the forward driver are both provided with forward gear teeth by which the forward connector and the forward driver are engaged with each other, and the reverse driver and the reverse connector are both provided with reverse gear teeth by which the reverse driver and the reverse connector are engaged with each other.

8. The blender according to claim 1, further comprising a housing including an upper housing for containing the blade device and a lower housing for containing the transmission base.

9. The blender according to claim 1, wherein the transmission base is further arranged with a motor for supplying power to the motor shaft, and the motor is connected to a bottom of the motor shaft.

* * * * *